United States Patent [19]

Berneth et al.

[11] Patent Number: 4,831,141
[45] Date of Patent: May 16, 1989

[54] CHROMOGENIC 3,1-BENZOXAZINES

[75] Inventors: Horst Berneth, Leverkusen; Gert Jabs, Odenthal, both of Fed. Rep. of Germany

[73] Assignee: Bayer Aktiengesellschaft, Leverkusen, Fed. Rep. of Germany

[21] Appl. No.: 56,569

[22] Filed: Jun. 1, 1987

[30] Foreign Application Priority Data

Jul. 2, 1986 [DE] Fed. Rep. of Germany ....... 3622262

[51] Int. Cl.$^4$ .......................................... C07D 265/36
[52] U.S. Cl. ..................................... 544/90; 540/552; 544/73; 544/74; 544/95
[58] Field of Search ................... 540/552; 544/73, 74, 544/90, 95

[56] References Cited

U.S. PATENT DOCUMENTS

| | | | |
|---|---|---|---|
| 4,070,508 | 1/1978 | Ishige et al. | 427/282 |
| 4,074,050 | 2/1978 | Ozutsumi et al. | 544/92 |
| 4,727,140 | 2/1988 | Meisel et al. | 544/92 |
| 4,754,034 | 6/1988 | Berneth et al. | 544/286 |

FOREIGN PATENT DOCUMENTS

| | | |
|---|---|---|
| 0187329 | 7/1986 | European Pat. Off. . |
| 3500361 | 10/1986 | Fed. Rep. of Germany . |

OTHER PUBLICATIONS

Chemical Abstracts, Band 70, 1969, Seite 341, Zusammenfassung Nr. 47472r, Columbus, Ohio, U.S.; SA-A-67 06 887 (Farbwerke Hoechst A.-G.) 10-0-4-1968.

*Primary Examiner*—Richard L. Raymond
*Attorney, Agent, or Firm*—Sprung Horn Kramer & Woods

[57] ABSTRACT

The invention relates to chromogenic 3,1-benzoxazines of the formula

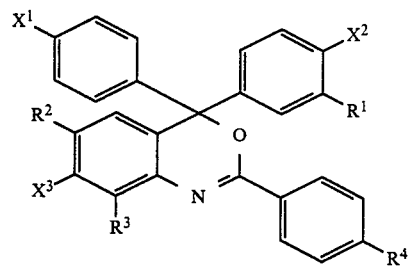

wherein
$X^1$ denotes hydrogen, $C_1$-$C_4$-alkyl, chlorine or $OY^1$,
$X^2$ denotes $NY^2Y^3$,
$X^3$ denotes $OY^4$ or $NY^5Y^6$,
$R^1$-$R^3$ independently of one another denote hydrogen, $C_1$-$C_4$-alkyl, chlorine, $C_1$-$C_4$-alkoxy or $C_1$-$C_4$-mono- or -dialkylamino, or
$R^1$ together with $Y^2$,
$R^2$ or $R^3$ together with $Y^4$ or $Y^5$, or
$R^2$ and $R^3$ simultaneously with $Y^5$ and $Y^6$ denote a 2 to 4-membered bridge which can contain one oxygen atom or one nitrogen atom and can carry up to 4 methyl groups, and wherein
$R^1$ and $R^3$ simultaneously represent hydrogen only if $R^2$ with $Y^4$ or $Y^5$ forms one of the abovementioned bridges,
$R^4$ denotes hydrogen, methyl or chlorine,
$Y^1$ and $Y^4$ independently of one another denote $C_1$-$C_4$-alkyl, cyclohexyl or benzyl and $Y^2$, $Y^3$, $Y^5$ and $Y^6$ independently of one another denote hydrogen, $C_1$-$C_4$-alkyl, cyclohexyl or benzyl, are used for pressure-copying, thermoreactive or electrochromic recording materials.

6 Claims, No Drawings

CHROMOGENIC 3,1-BENZOXAZINES

The invention relates to chromogenic 3,1-benzoxazines of the formula

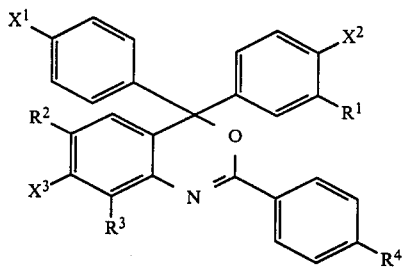
(I)

wherein
$X^1$ denotes hydrogen, $C_1$-$C_4$-alkyl, chlorine or $OY^1$,
$X^2$ denotes $NY^2Y^3$,
$X^3$ denotes $OY^4$ or $NY^5Y^6$,
$R^1$–$R^3$ independently of one another denote hydrogen, $C_1$-$C_4$-alkyl, chlorine, $C_1$-$C_4$-alkoxy or $C_1$-$C_4$-mono- or -dialkylamino, or
$R^1$ together with $Y^2$,
$R^2$ or $R^3$ together with $Y^4$ or $Y^5$, or
$R^2$ and $R^3$ simultaneously with $Y^5$ and $Y^6$ denote a 2 to 4-membered bridge which can contain one oxygen atom or one nitrogen atom and can carry up to 4 methyl groups, and wherein
$R^1$ and $R^3$ simultaneously represent hydrogen only if $R^2$ with $Y^4$ or $Y^5$ forms one of the above-mentioned bridges,
$R^4$ denotes hydrogen, methyl or chlorine,
$Y^1$ and $Y^4$ independently of one another denote $C_1$-$C_4$-alkyl, cyclohexyl or benzyl and
$Y^2$, $Y^3$, $Y^5$ and $Y^6$ independently of one another denote hydrogen, $C_1$-$C_4$-alkyl, cyclohexyl or benzyl, their preparation and their use for pressure-copying, thermoreactive or electrochromic recording materials.

Examples of preferred bridge members are given in the case of formula (II) under $X^5$ and $X^6$.

Preferred chromogenic 3,1-benzoxazines are those of the formula

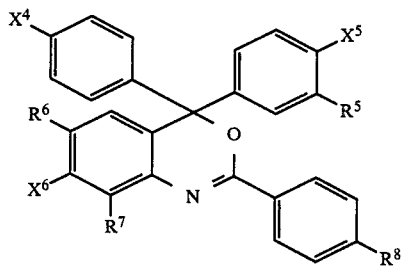
(II)

wherein
$X^4$ denotes hydrogen, methyl, ethyl, chlorine, methoxy or ethoxy,
$X^5$ denotes dimethylamino or diethylamino, or together with $R^5$ denotes a grouping of the formula

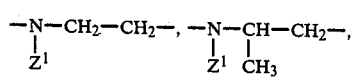

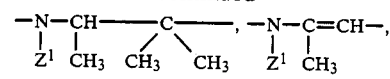

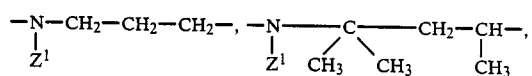

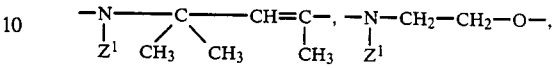

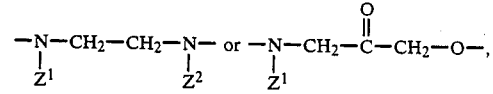

$X^6$ denotes methoxy, ethoxy, dimethylamino or diethylamino, or together with $R^7$ denotes a grouping of the formula —O—$CH_2$—$CH_2$—, —O—$CH_2$—O— or —O—$CH_2$—$CH_2$O— or one of the groupings mentioned for $X^5/R^5$,
$R^5$ and $R^6$ independently of one another denote hydrogen, methyl, ethyl, chlorine, methoxy, ethoxy, methylamino, ethylamino or dimethylamino,
$R^7$ denotes methyl, ethyl, chlorine, methoxy, ethoxy, methylamino, ethylamino or dimethylamino,
$R^8$ denotes hydrogen, methyl or chlorine and
$Z^1$ and $Z^2$ independently of one another denote hydrogen, methyl or ethyl,

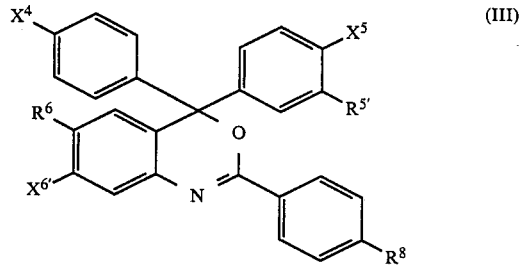
(III)

wherein
$X^4$, $X^5$, $R^6$ and $R^8$ have the meaning given in the case of formula (II),
$X^{6'}$ denotes methoxy, ethoxy, dimethylamino or diethylamino and
$R^{5'}$ denotes methyl, ethyl, chloro, methoxy, ethoxy, methylamino, ethylamino or dimethylamino, and

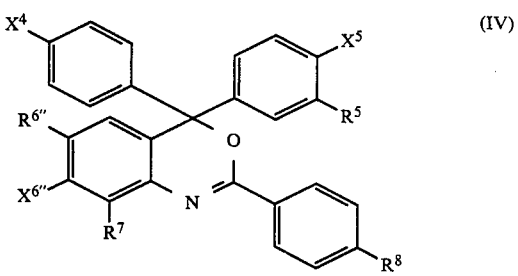
(IV)

wherein
$X^4$, $X^5$, $R^5$ and $R^8$ have the meaning given in the case of formula (II),
$X^{6''}$ with $R^{6''}$ denotes a grouping of the formula —O—$CH_2$—$CH_2$—, —O—$CH_2$—O— or —O—CH$_2$—CH$_2$—O— or one of the groupings mentioned in the case of X$^5$/R$^5$, or X$^{6''}$ with R$^{6''}$ and R$^{7'}$ denotes a grouping of the formula

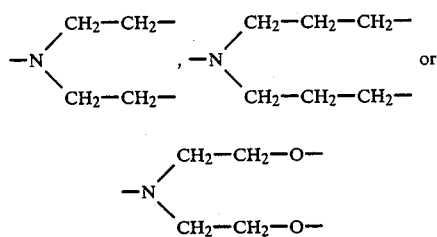

or

R$^{7'}$ denotes hydrogen, methyl, ethyl, chlorine, methoxy, ethoxy, methylamino, ethylamino or dimethylamino.

If the substituents X$^5$, X$^6$, X$^{6'}$ and X$^{6''}$ are cyclic in the formulae (II)–(IV), the nitrogen or oxygen atoms in the abovementioned bridge members are at the linkage sites designated X$^5$, X$^6$, X$^{6'}$ and X$^{6''}$ in the formulae.

Particularly preferred 3,1-benzoxazines have the formula

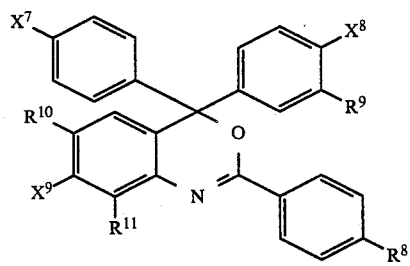 (V)

wherein

R$^8$ has the meaning given in the case of formula (II),

X$^7$ denotes hydrogen, methyl, chlorine, methoxy or ethoxy,

X$^8$ denotes dimethylamino or diethylamino,

X$^9$ denotes methoxy, ethoxy, dimethylamino or diethylamino and

R$^9$, R$^{10}$ and R$^{11}$ denote hydrogen, methyl, chlorine, methoxy or ethoxy, but R$^9$ and R$^{11}$ are not simultaneously hydrogen.

The invention also relates to mixtures of 3,1-benzoxazines of the formulae

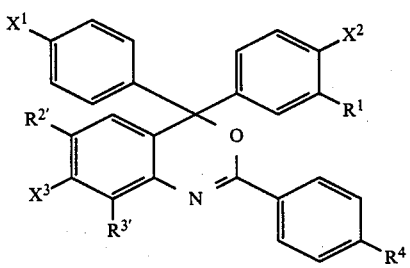 (VI)

and

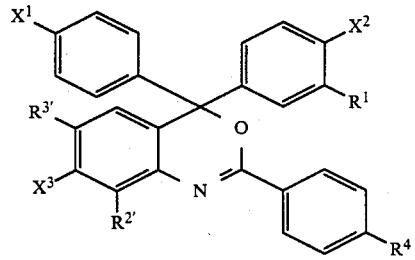 (VII)

wherein

X$^1$ denotes hydrogen, C$_1$–C$_4$-alkyl, chlorine or OY$^1$,

X$^2$ denotes NY$^2$Y$^3$,

X$^3$ denotes OY$^4$ or NY$^5$Y$^6$,

R$^1$ and R$^{3'}$ independently of one another denote hydrogen, C$_1$–C$_4$-alkyl, chlorine, C$_1$–C$_4$-alkoxy or C$_1$–C$_4$-mono- or -dialkylamino, R$^{2'}$ denotes C$_1$–C$_4$-alkyl, chlorine, C$_1$–C$_4$-alkoxy or C$_1$–C$_4$-mono- or -dialkylamino, or R$^1$ together with Y$^2$, or R$^{2'}$ or R$^{3'}$, together with Y$^4$ or Y$^5$, denote a 2- to 4-membered bridge which can contain an oxygen or nitrogen atom and can carry up to 4 methyl groups, Y$^1$ and Y$^4$ independently of one another denote C$_1$–C$_4$-alkyl, cyclohexyl or benzyl and Y$^2$, Y$^3$, Y$^5$ and Y$^6$ independently of one another denote hydrogen, C$_1$–C$_4$-alkyl, cyclohexyl or benzyl, and wherein, R$^{2'}$ and R$^{3'}$ differ from one another and the bridge members mentioned preferably have the meaning given in the case of formula (II), and mixtures of 3,1-benzoxazines (I), in particular (II)(V), and (VI)/(VII) with 3,1-benzoxazines of the formula

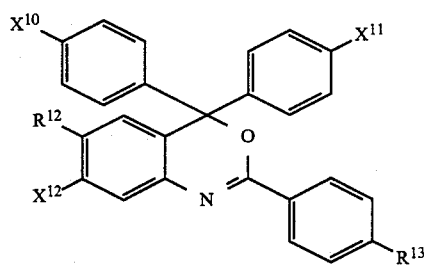 (VIII)

wherein

X$^{10}$ denotes hydrogen, C$_1$–C$_4$-alkyl, chlorine or OY$^7$,

X$^{11}$ denotes NY$^8$Y$^9$,

X$^{12}$ denotes OY$^{10}$ or NY$^{11}$Y$^{12}$,

R$^{12}$ denotes hydrogen, C$_1$–C$_4$-alkyl, chlorine, C$_1$–C$_4$-alkoxy or C$_1$–C$_4$-mono- or -dialkylamino, R$^{13}$ denotes hydrogen, methyl or chlorine, Y$^7$ and Y$^{10}$ independently of one another denote C$_1$–C$_4$-alkyl, cyclohexyl or benzyl and Y$^8$, Y$^9$, Y$^{11}$ and Y$^{12}$ independently of one another denote hydrogen, C$_1$–C$_4$-alkyl, cyclohexyl or benzyl.

The invention also relates to leuco compounds of the formula

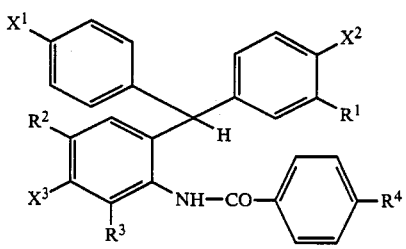 (IX)

wherein the substituents have the meaning given in the case of formula (I).

The invention also relates to processes for the preparation of the 3,1-benzoxazines of the formula (I) by reaction of amides of the formula

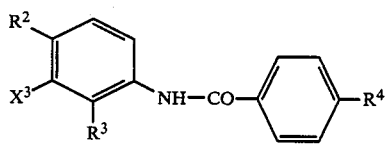 (X)

with ketones of the formula

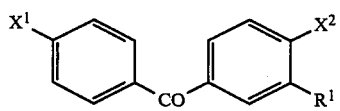 (XI)

or of compounds of the formula

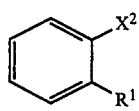 (XII)

with ketones of the formula

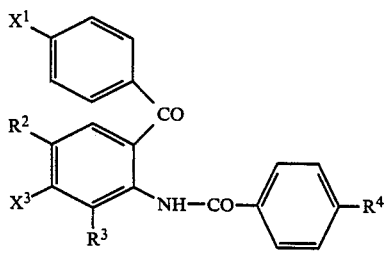 (XIII)

wherein
$X^1$–$X^3$ and $R^1$–$R^4$ have the meaning given in the case of formula (I).

The reaction is usually carried out with dehydrating reagents in the absence or presence of solvents which are inert under these conditions, at temperatures between 0° C. and the boiling point of the particular medium. The mixture is then discharged onto, for example, water or an alcohol.

The 3,1-benzoxazines of the formula (I) are obtained by increasing the pH with, for example, alkali metal or alkaline earth metal hydroxides, carbonates, bicarbonates, ammonia or amines until the colour of this mixture disappears—if appropriate after removal of the inert solvents. It may be necessary here to warm the mixture for some time to remove the water from any carbinol bases formed, or to treat the impure product primarily obtained in solvents, such as alcohols—for example methanol, ethanol, 2-propanol or butanol; nitriles—for example acetonitrile; ketones—for example acetone or 2-butanone; hydrocarbons—for example toluene or xylene; chlorinated hydrocarbons—for example chlorobenzene, dichlorobenzene, chloroform or 1,2-dichloroethane, or esters—for example ethyl acetate or butyl acetate, at temperature between room temperature and the boiling point of the particular medium for some time.

Examples of dehydrating reagents are phosphorus oxychloride, phosphorus pentachloride, diphosphorus pentoxide, triphenyl-phosphorus dichloride, phosgene, phosphorus trichloride, phosphorus tribromide, sulphuryl chloride, thionyl chloride, oxalyl chloride or mixtures thereof. Phosphorus oxychloride, phosphorus oxychloride/ disphosphorus pentoxide, phosgene or oxalyl chloride are preferably employed.

In some cases it is advantageous to add bases, such as pyridine, quinoline, diazabicyclooctane, 1-methylimidazole or diazabicyclononene or -undecene, or Lewis acids, such as boron fluoride, boron chloride, aluminium chloride, zinc chloride or tin(IV) chloride.

Examples of suitable inert solvents are toluene, chlorobenzene, dichlorobenzene, nitrobenzene and chlorinated aliphatic hydrocarbons, such as 1,2-dichloroethane.

The invention also relates to a process for the preparation of chromogenic 3,1-benzoxazines of the formula I, characterized in that a leuco compound of the formula (IX) is oxidized.

This oxidation can be carried out in a known manner with higher-valent metal compounds, such as $PbO_2$, $MnO_2$, permanganates, $CrO_3$, chromates, dichromates, $NiO_2$ or $K_3[Fe(CN)_6]$, with quinones, such as p-benzoquinone, chloranil, tetrachloro-o-quinone or dichlorodicyano-quinone, or in another manner known from the literature, such as, for example, with oxygen, air, perborates or hydrogen peroxide.

Working up, isolation and any after-treatment are carried out in a manner analogous to that described above.

The oxidation with higher-valent metal compounds is usually carried out in an acid medium or in organic solvents, such as alcohols—for example ethanol, isopropanol or ethylene glycol monomethyl ether; ketones—for example acetone, butanone or methyl isopropyl ketone, or polar aprotic solvents, for example N-methylpyrrolidone, γ-butyrolactone, acetonitrile, dimethylsulphoxide or sulpholane, or in mixtures of such solvents, with acids at temperatures between 0° C. and 60° C., preferably at 10°–40° C.

Examples of suitable acids are hydrochloric acid, sulphuric acid, phosphoric acid, acetic acid, propionic acid or mixtures with one another and/or mixtures with water. A preferred mixture is hydrochloric acid, acetic acid and water.

The oxidation with quinones is usually carried out in organic solvents, such as alcohols—for example methanol, ethanol or isopropanol; ketones—for example acetone or butanone; esters, for example ethyl acetate or butyl acetate; carboxylic acids—for example acetic acid or propionic acid; aromatics—for example toluene, chlorobenzene or dichlorobenzene, or polar aprotic solvents, such as N-methylpyrrolidone, dimethylformamide, γ-butyrolactone, acetonitrile or sulpholan, or in mixtures thereof, at temperatures between 0° C. and the boiling point of the medium, preferably at 20°–70° C.

Mixtures of chromogenic 3,1-benzoxazines of the formulae (VI) and (VII) to which the invention particularly preferably relates can be prepared either by mixing the corresponding 3,1-benzoxazines, or particularly advantageously directly during synthesis, for example by reaction of a corresponding mixture of amides of the formula (X) with ketones of the formula (XI).

The 3,1-benzoxazines of the formula (I) and their mixture are usually colourless or at most slightly coloured.

The invention also relates to the use of the chromogenic 3,1-benzoxazines of the formula (I) or mixtures thereof for pressure-copying, thermoreactive or electrochromic recording materials, characterized in that the recording material contains an acid colour developer.

Acid developers which may be mentioned in particular are clays, acid oxides and acid salts as well as monomeric or polymeric phenols or carboxylic acids.

When the colour-forming agents are brought into contact with the acid developer, intensive green-blue, green, black, violet or red colour shades which are outstandingly fast to sublimation and light result. Navy blue, grey or black dyeings can be achieved by mixtures with one another.

They are also useful when mixed with one or more other known colour-forming agents, for example 3,3-bis-(aminophenyl)-phthalides, 3,3-bis-(indolyl)phthalides, 3-aminofluoranes, spirodipyrans, chromenoindoles, phenoxazines, phenothiazones, carbazolylmethanes, 4,4-diaryldihydroquinazolones or other triarylmethane leuco-dyestuffs, to give green, violet, blue, navy blue, grey or black dyeings.

The 3,1-benzoxazines of the formula (I) exhibit a good colour intensity both on phenolic substrates and, in particular, on activated clays. They are suitable above all as colour-forming agents for use in a heat-sensitive or pressure-sensitive recording material, which can be either a copying or a registering material. Their speed of development is virtually independent of the substituents. They are in general characterized by a high speed of development coupled with a reduced sensitivity of the recording materials to unintentional premature development.

They can therefore be combined with one another in almost any desired manner. Their development colour shade is reached immediately, without undesirable changes in shade occurring during or after the development.

The 3,1-benzoxazines of the formula (I) are distinguished by a good fastness to light and stability towards climatic ageing, both in the developed and in the undeveloped state. Their fastness to light in the undeveloped state is improved in comparison with those 3,1-benzoxazines in which $R^1 = R^2 = R^3 =$ hydrogen.

A pressure-sensitive material consists, for example, of at least 1 pair of sheets which contain at least one colour-forming agent of the formula (I), dissolved or dispersed in a non-volatile organic solvent, and one acid developer.

Such processes and formulations are known, for example, from U.S. Pat. Nos. 2,800,457, 2,800,458, 2,948,753, 3,096,189 and 3,193,404 and from German Offenlegungsschriften (German Published Specifications) 2,555,080 and 2,700,937.

In order to prevent premature activation of the colour-forming agents present in the pressure-sensitive recording material, these are preferably enclosed in microcapsules, which as a rule can be crushed by pressure.

Examples of suitable materials for the capsule walls are gelatine/gum arabic, polyamides, polyurethanes, polysulphonamides, polyesters, polycarbonates, polysulphonates, polyacrylates and phenol-, melamine- or urea-formaldehyde condensates, such as are described, for example, in M. Gutcho, Capsule Technology and Micro-encapsulation, Noyes Data Corporation 1972, G. Baxter, Microencapsulation, Processes and Applications, published by J.E. Vandegaar, and German Offenlegungsschriften (German Published Specifications Nos.) 2,237,545 and 2,119,933.

Microcapsules with shells which consist of polyaddition products of poly-isocyanates and polyamines are preferably used in the process according to the invention.

Isocyanates which are employed to produce such microcapsules are diisocyanates, polyisocyanates, diisocyanates with a biuret structure, polyisocyanates modified by di- or trifunctional alcohols or other modified isocyanates, for example those of the formula

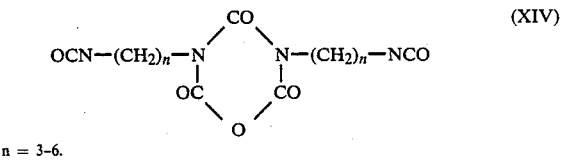

$n = 3–6$.

Diamines which are suitable for reaction with the isocyanates mentioned are aliphatic primary or secondary di- and polyamines.

Isocyanates, amines, solvents and a suitable production process for such microcapsules are described, for example, in DE-OS (German Published Specification No.) 3,203,059.

Microcapsules with shells which consist of polyamides or melamine-formaldehyde condensates or gelatine/gum arabic are also preferably used in the process according to the invention.

Thermoreactive recording systems include, for example, heat-sensitive recording and copying materials and papers.

Such a material is described, for example, in German Offenlegungsschrift (German Published Specification No.) 2,555,080.

Suitable developers are the same electron acceptors as are used in pressure-sensitive papers, preferably phenolic compounds, which are described, for example, in German Patent Specification No. 1,251,348, as well as boric acid and organic, preferably aliphatic dicarboxylic acids.

Another suitable thermoreactive development system in which acid-modified polymers, preferably of acrylonitrile, act as the developer is described in DE-OS (German Published Specification No.) 3,337,296.

The leuco compounds of the formula (IX) can be incorporated, for example, into the customary pressure- or thermoreactive papers as a slowly developing colour-forming agent. In these, because of their good fastness to light, they serve as mixing components for colour-forming agents which develop rapidly but have a low fastness to light, for example crystal violet lactone. the fastness to light of the recording is thus improved.

The leuco compounds of the formula (IX) are also suitable for pressure- or thermoreactive recording materials which develop oxidatively. In these, a suitable oxidizing agent is added to the colour-forming agent or to the developer. Such a process is described, for example, in DE-OS (German Published Specification No.) 3,390,001.

The 3,1-benzoxazines of the formula (I) and the dyestuffs formed therefrom by ring-opening are suitable for dyeing polyacrylonitrile, tannin-treated cotton and other acid-modifed fibres, fabrics and powders.

EXAMPLE 1

76.6 g of phosphorus oxychloride, 23.9 g of 4-(dimethylamino)-3-methylbenzophenone, 24.0 g of 3-benzoylamino-N,N-dimethylaniline and 42.4 g of phosphorus pentoxide are stirred at 40° C. for 48 hours. The melt is poured onto 200 ml of toluene and 500 ml of ice-water. The pH is brought to 6-7 and the aqueous phase is separated off. The toluene phase is extracted with 150 ml of 3% strength hydrochloric acid. The hydrochloric acid phase is separated off and rendered alkaline and the product is taken up in 200 ml of toluene. The toluene phase is distilled until anhydrous. Finally, the toluene is distilled off and the residue is made to crystallize with 50 ml of ethanol. Filtration with suction and drying gives 10.7 g (23% of theory) of a pale yellow powder with a melting point of 148°-150° C. and the formula

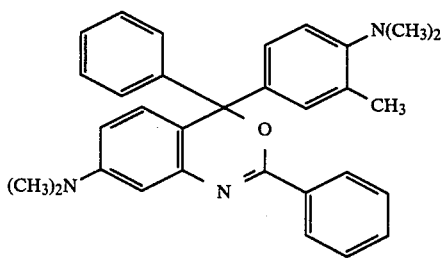

IR (KBr): 1603 cm$^{-1}$
$\lambda_{max}$ (glacial acetic acid): 450, 652 nm.

Colour on acid clay: green
Colour on salicylate: green

EXAMPLE 2

The compound of the formula

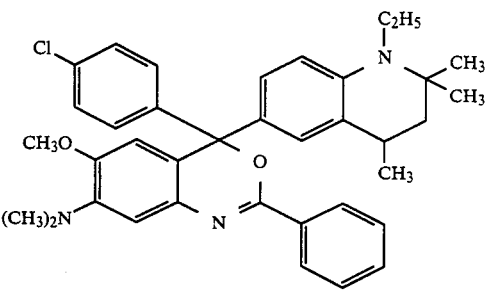

can be prepared analogously.
$\lambda_{max}$ (glacial acetic acid): 466, 684 nm.
Colour on acid clay: dull yellowish-tinged green.
Examples 3–7 can be prepared analogously.

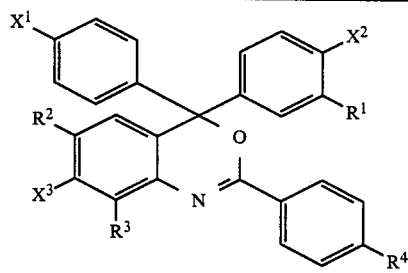

| Example | X$^1$ | X$^2$ | R$^1$ | X$^3$ | R$^2$ | R$^3$ | R$^4$ | Colour shade on acid clay |
|---|---|---|---|---|---|---|---|---|
| 3 | OCH$_3$ | N(CH$_3$)$_2$ | CH$_3$ | N(CH$_3$)$_2$ | H | H | H | bluish-tinged green |
| 4 | H | N(CH$_3$)$_2$ | OCH$_3$ | N(C$_2$H$_5$)$_2$ | H | H | CH$_3$ | dull green |
| 5 | CH(CH$_3$)$_2$ | —N—CH$_2$—CH$_2$—<br>\|<br>CH$_3$ | | —N—CH$_2$—CH$_2$—<br>\|<br>CH$_3$ | | H | H | green |
| 6 | OCH$_3$ | N(CH$_3$)$_2$ | CH$_3$ | OCH$_3$ | CH$_3$ | H | Cl | black |
| 7 | H | N(CH$_3$)$_2$ | CH$_3$ | N(CH$_3$)$_2$ | H | CH$_3$ | H | dull green |

EXAMPLE 8

59.8 g of phosphorus oxychloride, 22.0 g of 4-methoxy-4'-diethylamino-benzophenone, 18.5 g of 3-benzoylamino-2-methyl-N,N-dimethylaniline and 33.3 g of phosphorus pentoxide are stirred at 50° C. for 48 hours. The mixture is then poured onto 400 ml of water and 150 ml of toluene at 20°-25° C. The pH is brought to 8 and the aqueous phase is separated off. The toluene phase is washed with 400 ml of water, distilled until anhydrous and then concentrated by distillation.

The residue is dissolved in 70 ml of warm ethanol, 0.5 ml of 10% strength sodium hydroxide solution is added and the mixture is stirred until cold. The product is filtered off with suction and washed with ethanol and water: 7.6 g (19% of theory) of beige crystals with a melting point of 163°-166° C. and the formula

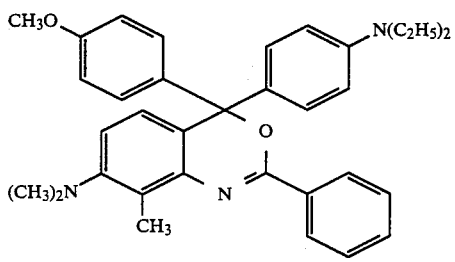

IR (KBr): 1611 cm$^{-1}$
$\lambda_{max}$ (glacial acetic acid): 486, 598 nm.
Colour shade on acid clay: bluish-tinged black.
Colour on bisphenol A: bluish-tinged black.

EXAMPLE 9

The compound of the formula

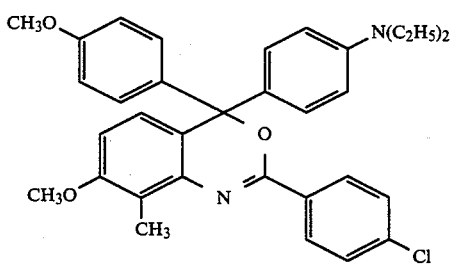

can be prepared analogously in an 85% yield.
IR (KBr): 1610 cm$^{-1}$
Melting point: 177°–178° C.
$\lambda_{max}$ (glacial acetic acid): 430, 540 nm.
Colour on acid clay: claret.
Examples 10–17 can be prepared analogously.

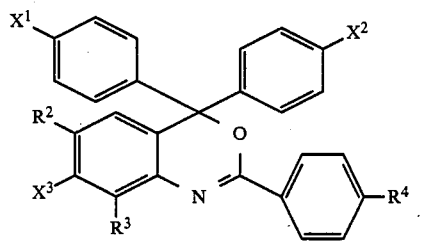

| Example | X$^1$ | X$^2$ | X$^3$ | R$^2$ | R$^3$ | R$^4$ | Colour shade on acid clay |
|---|---|---|---|---|---|---|---|
| 10 | H | N(CH$_3$)$_2$ | NHCH$_3$ | CH$_3$ | CH$_3$ | H | green |
| 11 | CH$_3$ | N(C$_2$H$_5$)$_2$ | N(CH$_3$)$_2$ | H | Cl | CH$_3$ | dull green |
| 12 | n-C$_4$H$_9$ | N(CH$_3$)$_2$ | N(CH$_2$C$_6$H$_5$)$_2$ | H | OCH$_3$ | Cl | dull green |
| 13 | H | N(C$_2$H$_5$)$_2$ | OCH$_3$ | OCH$_3$ | Cl | H | claret |
| 14 | H | N(C$_4$H$_9$)$_2$ | N(C$_2$H$_5$)$_2$ | CH$_3$ | Cl | Cl | dull green |
| 15 | OCH$_3$ | N(CH$_3$)$_2$ | NHC$_2$H$_5$ | Cl | Cl | H | dirty green |
| 16 | H | N(C$_2$H$_5$)$_2$ | N(CH$_3$)$_2$ | H | CH$_3$ | H | dull green |
| 17 | Cl | N(C$_2$H$_5$)$_2$ | N(CH$_3$)$_2$ | H | CH$_3$ | H | dull green |

EXAMPLE 18

76.6 g of phosphorus oxychloride, 25.3 g of 4-diethylaminobenzophenol, 35.6 g of 1-ethyl-2,2,4-trimethyl-7-(4-chlorobenzoylamino)-1,2,3,4-tetrahydroquinoline and 42.4 g of phosphorus pentoxide are stirred at 40°–60° C. for 44 hours. The melt is taken up in 25 ml of acetonitrile and the mixture is poured onto 200 ml of toluene and 500 ml of ice-water. The mixture is brought to pH 9, the water is separated off at 50° C. and the mixture is washed with 500 ml of water again at 50° C. The toluene is distilled off and the residue is dissolved in 100 ml of warm ethanol. After cooling, the product is filtered off with suction, washed with ethanol and water and dried.

44.6 g (75% of theory) of a pale green-yellow crystalline powder with a melting point 205°–207° C. and of the formula

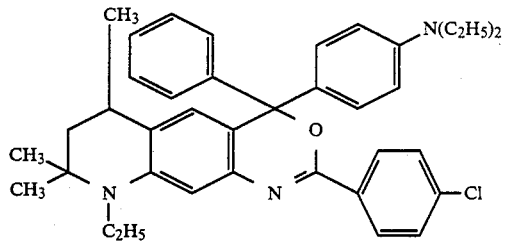

IR (KBr): 1603 cm$^{-1}$
$\lambda_{max}$ (glacial acetic acid): 449, 666 nm.
Colour on acid clay: luminous green.
Colour on phenolic resin: yellowish-tinged green.
Colour with bisphenol A: yellowish-tinged green.

EXAMPLE 19

The compound of the formula

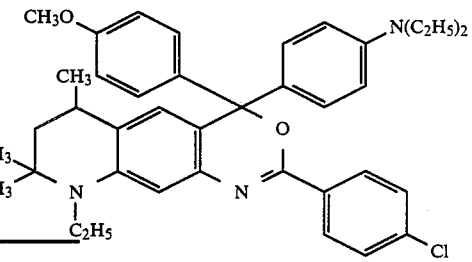

can be prepared analogously in a 63% yield.
Melting point: 97°–100° C.
$\lambda_{max}$ (glacial acetic acid): 488, 652 nm.
Colour on acid clay: dull green.

Colour on salicylate: olive.

Examples 20-29 can be prepared analogously.

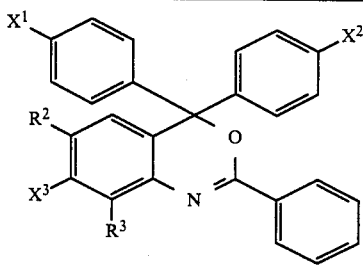

| Example | X¹ | X² | R² X³ | R³ | Colour on acid clay |
|---|---|---|---|---|---|
| 20 | $C_2H_5$ | $N(CH_3)_2$ | $-CH_2CH_2CH_2-N(CH_3)-$ | H | yellowish-tinged green |
| 21 | $OCH_3$ | $N(CH_3)_2$ | $-C(CH_3)=CH-C(CH_3)_2-N(CH_3)-$ | H | green |
| 22 | Cl | $N(CH_2C_6H_5)(CH_3)$ | $-O-CH_2CH_2-N(C_2H_5)-$ | H | yellowish-tinged green |
| 23 | $OC_2H_5$ | $N(CH_3)_2$ | $-N(CH_3)-CH_2-CH_2-N(CH_3)-$ | $CH_3$ | green |
| 24 | H | $N(CH_3)_2$ | $-N(C_2H_5)-CH_2CH_2-N(C_2H_5)-$ | H | green |
| 25 | Cl | $N(C_2H_5)_2$ | $-CH(CH_3)-CH_2-CH(CH_3)-NH-$ | H | yellowish-tinged green |
| 26 | H | $N(CH_3)_2$ | $-CH_2-CH_2-N(CH_3)-$ | H | yellowish-tinged green |
| 27 | Cl | $N(n-C_3H_7)_2$ | $-C(CH_3)_2-CH(CH_3)-N(CH_3)-$ | H | yellowish-tinged green |
| 28 | $OCH_3$ | $N(CH_3)_2$ | $-OCH_2-CO-CH_2-N(CH_3)-$ | H | green |
| 29 | Cl | $N(C_6H_{11})(CH_3)$ | $-CH_2CH_2CH_2-N-CH_2CH_2CH_2-$ | | brilliant yellowish-tinged green |

EXAMPLE 30

11.2 of acetic anhydride are added to 28.9 g of 4-chloro-4'-diethylaminobenzhydrol and 25.4 g of an 85:15 mixture of 5-benzoylamino-2-methyl-N,N-dimethylaniline and 3-benzoylamino-2-methyl-N,N-dimethylaniline in 100 ml of toluene under an $N_2$ atmosphere at 60° C. and the mixture is refluxed for 4 hours. This solution is cooled to 80° C., 25.8 g of chloroaniline are added and the mixture is refluxed for 15 minutes. It is diluted to 100 ml with toluene and poured onto a mixture of 500 ml of water and 30 ml of concentrated sodium hydroxide solution. After 2 hours at 50° C., a precipitate is filtered off. The toluene phase is separated off and evaporated. The residue is recrystallized in 300 ml of ethanol with the addition of 10 ml of 10% strength sodium hydroxide solution. The crystals are filtered off with suction, washed with ethanol and dried: 32.5 g (62% of theory) of a beige crystalline powder with a melting point of 163°–165° C. and of the formula

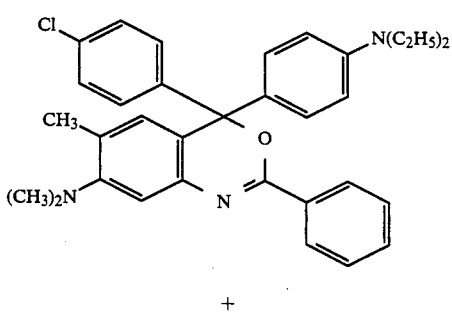

+

-continued

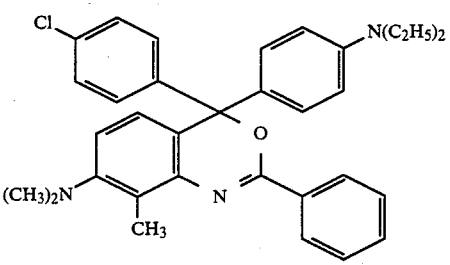

Mixture ratio: 95:5
$\lambda_{max}$ (glacial acetic acid): 451, 630 nm.
Colour on acid clay: dull green
Colour on phenolic resin: dull green
Colour on salicylate: dull green

EXAMPLE 31

15.2 g of oxalyl chloride are added dropwisse to a suspension of 78.3 g of 4-methoxy-4'-diethylaminobenzophenone in 70 ml of anhydrous 1,2-dichlorobenzene at 20° C. in the course of 1 hour. A warm solution of 25.4 g of an 85:15 mixture of 5-benzoylamino-2-methyl-N,N-dimethylaniline and 3-benzoylamino-2-methyl-N,N-dimethylaniline and 7.9 g of pyridine in 100 ml of anhydrous 1,2-dichlorobenzene is added dropwise to the resulting red solution at 30°-40° C. in the course of half an hour. After 4 hours at 40° C., the mixture is poured onto 150 ml of water and the pH is brought to 0.6-0.7 with hydrochloric acid.

The dichlorobenzene phase is separated off. 150 ml of toluene are added to the aqueous phase, the pH is brought to 5 and the mixture is boiled for half an hour. The toluene phase is separared off, distilled until anhydrous and then evaporated. The residue is dissolved in 100 ml of 2-propanol with the addition of 3 ml of 10% strength sodium hydroxide solution and the solution is warmed briefly to 70° C. and stirred until cold. The product is filtered off with suction, washed with 2-propanol and water and dried. 35.5 g (68% of theory) of a beige crystalline powder with a melting point of 160°-162° C. and of the formula

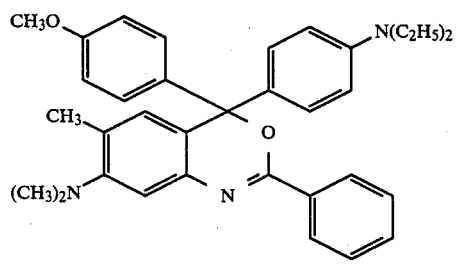

+

-continued

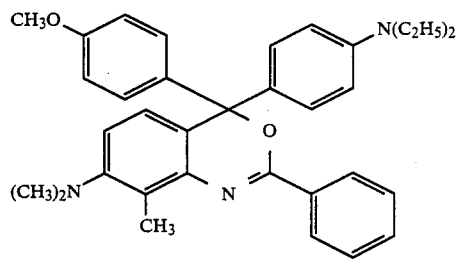

Mixture ratio: 90:10
$\lambda_{max}$ (glacial acetic acid): 492, 584 nm.
Colour on acid clay: black.
Colour on phenolic resin: black.
Colour on salicylate: black.

EXAMPLE 32

A mixture of the compounds of the formulae

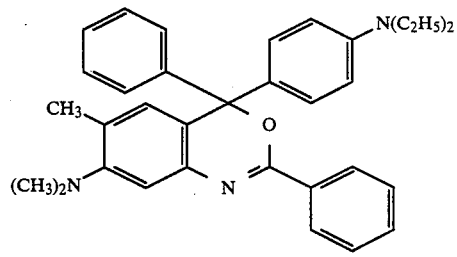

+

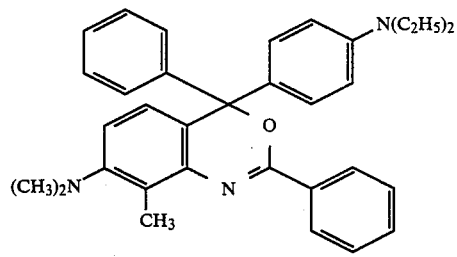

Mixture ratio
90:10 can be prepared in a 40% yield analogously to Example 30 or 31 or by the procedure analogous to Example 8.
Melting point: 134°-138° C.
$\lambda_{max}$ (glacial acetic acid): 445, 628 nm.
Colour on acid clay: dull green.
Colour on phenolic resin: dull green.
Colour on salicylate: dull green.

EXAMPLE 33

A mixture of the compounds of the formulae

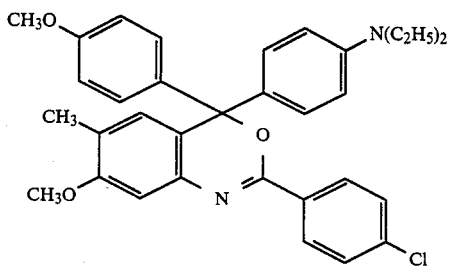

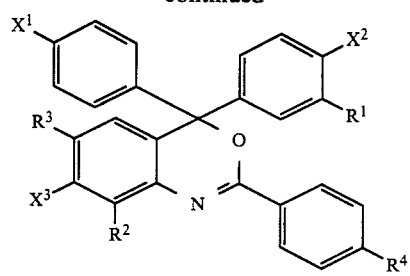

| Example | X¹ | X² | R¹ | X³ | R² | R³ | R⁴ | Colour shade on acid clay |
|---|---|---|---|---|---|---|---|---|
| 34 | H | N(CH$_3$)$_2$ | CH$_3$ | N(CH$_3$)$_2$ | CH$_3$ | H | H | dull green |
| 35 | Cl | N(C$_2$H$_5$)$_2$ | CH$_3$ | OCH$_3$ | CH$_3$ | H | Cl | claret |
| 36 | H | N(CH$_3$)$_2$ | H | N(CH$_3$)$_2$ | CH$_3$ | Cl | H | dull green |
| 37 | OCH$_3$ | N(C$_2$H$_5$)$_2$ | H | N(CH$_3$)$_2$ | OCH$_3$ | H | H | black |
| 38 | Cl | —N(C$_2$H$_5$)—C(CH$_3$)(CH$_3$)—CH$_2$—CH(CH$_3$)— | | N(CH$_3$)$_2$ | CH$_3$ | H | H | dull green |
| 39 | H | N(C$_2$H$_5$)$_2$ | H | —N(CH$_3$)—CH$_2$CH$_2$CH$_2$— | | H | CH$_3$ | green |
| 40 | OC$_2$H$_5$ | N(CH$_3$)$_2$ | H | OCH$_3$ | OCH$_3$ | CH$_3$ | H | claret |

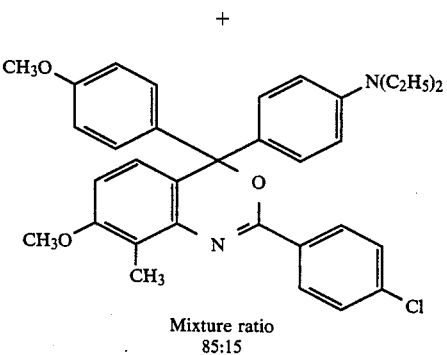

Mixture ratio 85:15 can be prepared in an 86% yield analogously to Example 30 or 31 or by a procedure analogous to Example 8.

$\lambda_{max}$ (glacial acetic acid): 547 nm.

Colour shade on acid clay: claret.

Colour shade on bisphenol A: claret.

The following mixtures can be prepared analogously or by mixing the individual components.

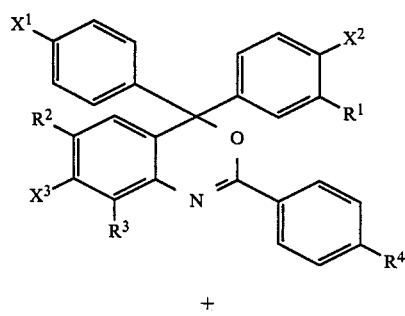

+

Preparation of a pressure-sensitive carbon-free copying paper

EXAMPLE 41

A solution of 3 g of the 3,1-benzoxazine compound of Example 1 in 80 g of diisopropylnaphthalene and 17 g of kerosene is microencapsulated with gelatine and gum arabic by coacervation in a manner which is known per se, and the microcapsules are mixed with starch solution and coated onto a sheet of paper. A second sheet of paper is coated on the front side with acid-activated bentonite as a colour developer. The first sheet and the sheet coated with colour developer are placed on top of one another with the coatings adjacent. Pressure is exerted by writing manually or with a typewriter on the first sheet, and an intense green copy which is outstandingly fast to light develops on the sheet coated with the developer.

If the paper coated with microcapsules is exposed to daylight and is then written on over the second sheet, an equally intense green copy is obtained as described above.

EXAMPLE 42

4.45 g of the 3,1-benzoxazine mixture of Example 31 and 0.55 g of 3,1-benzoxazine of the formula

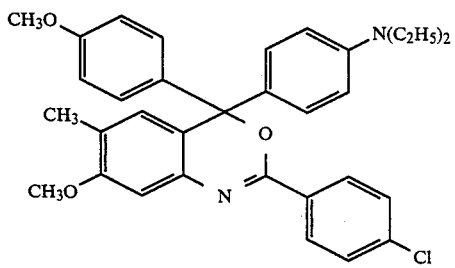

are dissolved in a mixture of 40 g of dodecylbenzene (Marlican from Hüls) and 60 g of chloroparaffin with a Cl content of 45%. 223 g of such a solution are mixed with 39.5 g of oxadiazinetrione from Desmodur H (NCO content 20.5%). The mixture is then mixed with 320 g of a 0.5% strength polyvinyl alcohol solution and emulsified in the shearing gradient of a rotor/stator emulsifying apparatus. Crosslinking is effected with 76 g of 9.0% strength diethylenetriamine solution. Aftertreatment is by warming the dispersion to 60° C. and stirring at 60° C. for three hours. A dispersion containing 40% of capsules of capsule size 7.3 μm is thereby obtained.

250 ml of this dispersion are taken and slowly sprinkled into 40 g of cellulose fine grindings (Arbocell BE 600/30 from Rettenmeier und Söhne), with intensive stirring. After intensive stirring for at least 30 minutes, 40 ml of 50% strength SBR latex (Baystal D 1600 from BAYER AG) are added. The resulting 48.5% strength staining colour is diluted with water to a solids content of 30% and coated onto the reverse side of a commercially available base paper using an air brush. After drying, the amount applied is 5 g/m².

The paper thus coated is placed with the coated side onto the side of a commercially available carbon-free copying paper coated with developer substance. When writing pressure is exerted on the paper coated with capsules, an intense black copy which is very fast to light results on the copying paper.

If the paper coated with a microcapsules is exposed to daylight and then written on over the second sheet, an equally intense black copy is obtained as described above.

Equally good developer substances on the commercially available carbon-free copying paper are, for example, acid-activated bentonite (for example Copisil D4A10 from Südchemie München), p-tert.-butylphenol-formaldehyde condensation products (for example UCAR-CKWA 9870 from Union Carbide Corporation) and p-alkyl-zinc salicylates.

EXAMPLE 43

If 3.57 g of the 3,1-benzoxazine mixture of Example 30 and 1.43 g of the 3,1-benzoxazine of the formula

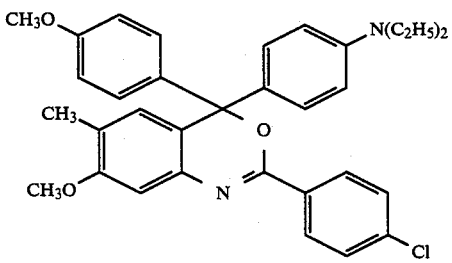

are used and the procedure followed is analogous to Example 42, a microcapsule-coated paper is obtained which, in an analogous manner, gives a black copy which is very fast to light. An equally intense black copy is also obtained after exposure of the microcapsule-coated paper to daylight.

EXAMPLE 44

5.0 g of the 3,1-benzoxazine of Example 18 are dissolved in 100 g of diisopropyldiphenyl. The subsequent procedure is otherwise analogous to Example 42. A microcapsule-coated paper which, when written on over the coated side of a commercially available carbon-free copying paper gives a luminous green copy which is very fast to light is thus obtained. An equally intense green copy is also obtained after exposure of the microcapsule-coated paper to daylight.

EXAMPLE 45

171 parts of an approximately 13% strength solution of a polyacrylic acid with an average molecular weight of less than 300,000 are brought to a pH of 4.5 with triethanolamine and to a total amount of 1,000 parts with water.

160 parts of a 90% strength melamine-formaldehyde resin (Luwipal 68 from BASF, Ludwigshafen) are added to this solution.

1,300 parts of a solution of 5% of the colour donator of Example 9 in diisopropylnaphthalene (KMC 113 from Rütgers Kureha Solvent, Duisburg) were then added and an emulsion was prepared with a mixing siren at a high speed of rotation.

The emulsion was then diluted with 700 parts of water, heated to 60° C., with stirring, and reacted completely at 60° for 6 hours. After cooling the dispersion, it was neutralized with triethanolamine.

A 40% strength microcapsule dispersion with an average capsule size of 5 μm was obtained.

This dispersion is brushed onto the reverse side of a commercially available base paper and dried.

Analogously to Example 42, when written on over the coated side of a commercially available carbon-free copying paper, this paper gives a claret-coloured copy which is very fast to light. An equally intense claret-coloured copy is also obtained after exposure of the microcapsule-coated paper to daylight.

If the procedure followed is an in Example 41, 42, 44 or 45 and a mixture of 3,1-benzoxazines as are listed in the following tables is employed, a coated sheet which gives a black copy which is outstandingly fast to light over commercially available carbon-free copying paper is obtained.

| Example | Compound of Example | Amount | Compound of Example | Amount |
| --- | --- | --- | --- | --- |
| 46 | 31 | 4.4 g | 33 | 0.6 g |
| 47 | 8 | 3.8 g | 9 | 1.2 g |
| 48 | 1 | 2.5 g | 33 | 2.5 g |
| 49 | 32 | 1.8 g | 13 | 3.2 g |
| 50 | 37 | 4.0 g | 35 | 1.0 g |

| Example | Compound of Example | Amount | Compound of the formula | Amount |
|---|---|---|---|---|
| 51 | 32 | 3.5 g | CH₃O—⟨aryl⟩—C(—⟨aryl⟩—N(C₂H₅)₂)(—⟨aryl with CH₃O⟩—)—O—N=C(—⟨aryl-Cl⟩) (3,1-benzoxazine with 4-CH₃O and 4'-N(C₂H₅)₂ phenyl groups, 6-methoxy, and 2-(4-chlorophenyl) substituents) | 1.5 g |
| 52 | 18 | 2.2 g | Analogous 3,1-benzoxazine with 4-CH₃O-phenyl, 4-N(C₂H₅)₂-phenyl, 6,7-dimethoxy on benzoxazine ring, and 2-phenyl | 2.8 g |
| 53 | 31 | 4.5 g | Analogous 3,1-benzoxazine with 4-CH₃O-phenyl, 4-N(C₂H₅)₂-phenyl, 6,7-dimethoxy, and 2-(4-chlorophenyl) | 0.5 g |
| 54 | 33 | 1.5 g | Analogous 3,1-benzoxazine with 4-Cl-phenyl, 4-N(C₂H₅)₂-phenyl, 6-CH₃, 7-N(CH₃)₂ on benzoxazine, and 2-phenyl | 3.5 g |
| 55 | 33 | 1.6 g | Analogous 3,1-benzoxazine with 4-Cl-phenyl, 4-N(C₂H₅)₂-phenyl, 6-CH₃O, 7-N(CH₃)₂ on benzoxazine, and 2-phenyl | 3.4 g |

Preparation of heat-sensitive recording materials

EXAMPLE 56

32 g of 4,4'-isopropylidene-diphenol (bisphenol A), 3.8 g of the distearylamide of ethylenediamine, 89 g of kaolin, 20 g of a polyvinyl alcohol hydrolyzed to the extent of 88% and 55 ml of water are ground in a ball mill until the particle size is about 5 μm. 6 g of the 3,1-benzoxazine compound of Example 8, 3 g of a polyvinyl alcohol hydrolyzed to the extent of 88% and 60 ml of water are ground to a particle size of about 3 μm in a second ball mill. The two dispersions are combined and coated onto paper with a dry application weight of 5.5 g/m². By touching the paper with a heated ballpoint pen, an intense bluish-tinged black colour which has good fastness to light and sublimation is obtained.

EXAMPLE 57

40 g of a finely powdered polyacrylonitrile polymer prepared from 94% of acrylonitrile, 0.5% of methallysulphonic acid and 5.5% of methyl acrylate are ground with 225 g of an 8% strength aqueous polyvinyl alcohol solution, with the addition of 1.3 g of distearyl-phosphoric acid ester, in a ball mill in accordance with DE-OS (German Published Specification No.) 3,337,296. A second dispersion is prepared from 1 g of the benzoxazine mixture of Example 30 and 55 g of an 8% strength aqueous polyvinyl alcohol solution. The dispersion of the colour-forming agent is mixed with that of the acceptor in a ratio of 1/10 and the mixture is applied to cellulose paper by means of a doctor blade and dried so that an application weight of 6 to 7 g/m² is obtained. The paper can be written on with writing materials, such as, for example, a ballpoint pen. It is insensitive towards heavy pressure. When the paper is touched with a heated pen, clear, sharp, green writing with no shadows is obtained. The dyeing has excellent fastness to light.

We claim:

1. A mixture of chromogenic 3,1-benzoxazines of the formulae

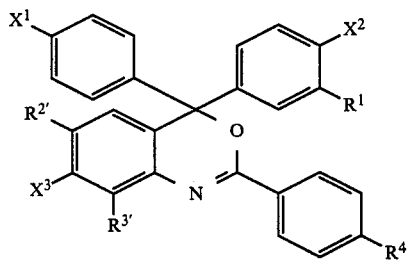

and

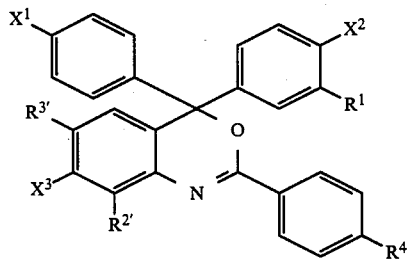

wherein
- $X^1$ denotes hydrogen, $C_1$-$C_4$-alkyl, chlorine or $OY^1$,
- $X^2$ denotes $NY^2Y^3$,
- $X^3$ denotes $OY^4$ or $NY^5Y^6$,
- $R^1$ and $R^{3'}$ independently of one another denote hydrogen, $C_1$-$C_4$-alkyl, chlorine, $C_1$-$C_4$-alkoxy or $C_1$-$C_4$-mono- or -dialkylamino,
- $R^{2'}$ denotes $C_1$-$C_4$-alkyl, chlorine, $C_1$-$C_4$-alkoxy or $C_1$-$C_4$-mono or -dialkylamino, or
- $R^1$ together with $Y^2$, or
- $R^{2'}$ or $R^{3'}$, together with $Y^4$ or $Y^5$, denote a 2- to 4-membered bridge which can contain an oxygen or nitrogen atom and can carry up to 4 methyl groups,
- $Y^1$ and $Y^4$ independently of one another denote $C_1$-$C_4$-alkyl, cyclohexyl or benzyl and
- $Y^2$, $Y^3$, $Y^5$ and $Y^6$ independently of one another denote hydrogen, $C_1$-$C_4$-alkyl, cyclohexyl or benzyl, and $R^{2'}$ and $R^{3'}$ are different from one another.

2. A mixture of chromogenic 3,1-benzoxazines of the formula

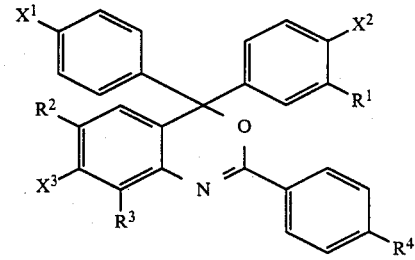

wherein
- $X^1$ denotes hydrogen, $C_1$-$C_4$-alkyl, chlorine or $OY^1$,
- $X^2$ denotes $NY^2Y^3$,
- $X^3$ denotes $OY^4$ or $NY^5Y^6$,
- $R^1$-$R^3$ independently of one another denote hydrogen, $C_1$-$C_4$-alkyl, chlorine, $C_1$-$C_4$-alkoxy or $C_1$-$C_4$-mono- or -dialkylamine, or
- $R^1$ together with $Y^2$,
- $R^2$ or $R^3$ together with $Y^4$ or $Y^5$, or
- $R^2$ and $R^3$ simultaneously with $Y^5$ and $Y^6$ denote a 2 to 4-membered bridge which can contain one oxygen atom or one nitrogen atom and can carry up to 4 methyl groups, and wherein
- $R^1$ and $R^3$ simultaneously represent hydrogen only if $R^2$ with $Y^4$ or $Y^5$ forms one of the above-mentioned bridges,
- $R^4$ denotes hydrogen, methyl or chlorine,
- $Y^1$ and $Y^4$ independently of one another denote $C_1$-$C_4$-alkyl, cyclohexyl or benzyl and
- $Y^2$, $Y^3$, $Y^5$ and $Y^6$ independently of one another denote hydrogen, $C_1$-$C_4$-alkyl, cyclohexyl or benzyl with 3,1-benzoxazines of the formula

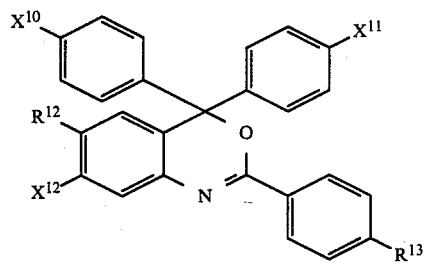

wherein
- $X^{10}$ denotes hydrogen, $C_1$-$C_4$-alkyl, chlorine or $OY^7$,
- $X^{11}$ denotes $NY^8Y^9$,
- $X^{12}$ denotes $OY^{10}$ or $NY^{11}Y^{12}$,
- $R^{12}$ denotes hydrogen, $C_1$-$C_4$-alkyl, chlorine, $C_1$-$C_4$-alkoxy or $C_1$-$C_4$-mono- or -dialkylamino,
- $R^{13}$ denotes hydrogen, methyl or chlorine,
- $Y^7$ and $Y^{10}$ independently of one another denote $C_1$-$C_4$-alkyl, cyclohexyl or benzyl and
- $Y^8$, $Y^9$, $Y^{11}$ and $Y^{12}$ independently of one another denote hydrogen, $C_1$-$C_4$-alkyl, cyclohexyl or benzyl.

3. A mixture according to claim 2, wherein the first chromogenic 3,1-benzoxazine is of the formula

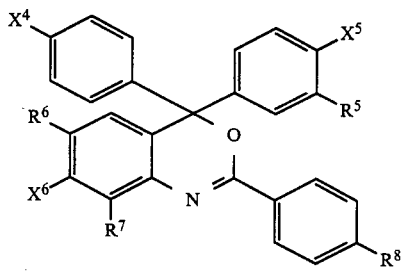

wherein
$X^4$ denotes hydrogen, methyl, ethyl, chlorine, methoxt or ethoxy,
$X^5$ denotes dimethylamino or diethylamine, or together with $R^5$ denotes a grouping of the formula

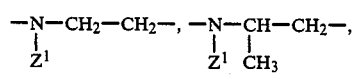

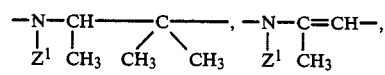

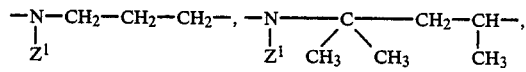

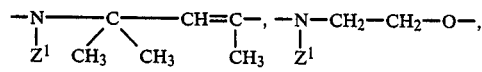

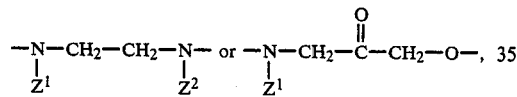

$X^6$ denotes methoxy, ethoxy, dimethylamino or diethylamino, or together with $R^7$ denotes a grouping of the formula —O—CH$_2$—CH$_2$—, —O—CH$_2$—O— or —O—CH$_2$—CH$_2$O— or one of the groupings mentioned for $X^5/R^5$, $R^5$ and $R^6$ independently of one another denote hydrogen, methyl, ethyl, chlorine, methoxy, ethoxy, methylamino, ethylamino or dimethylamino, $R^7$ denotes methyl, ethyl, chlorine, methoxy, ethoxy, methylamino, ethylamino or dimethylamino, $R^8$ denotes hydrogen, methyl or chlorine and $Z^1$ and $Z^2$ independently of one another denote hydrogen, methyl or ethyl.

4. A mixture according to claim 2, wherein the first chromogenic 3,1-benzoxazine is of the formula

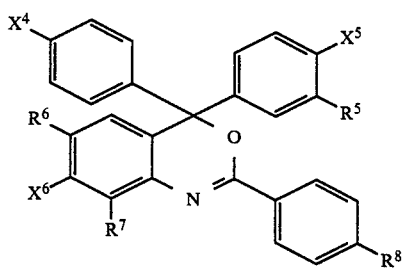

wherein
$X^{6'}$ denotes methoxy, ethoxy, dimethylamino or diethylamino and $R^{5'}$ denotes methyl, ethyl, chlorine, methoxy, ethoxy, methylamino, ethylamino or dimethylamino.

5. A mixture according to claim 2, wherein the first chromogenic 3,1-benzoxazine is of the formula

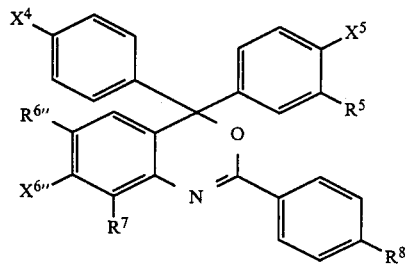

wherein
$X^{6''}$ with $R^{6''}$ denotes a grouping of the formula —O—CH$_2$—CH$_2$—, —O—CH$_2$—O— or —O—CH$_2$—CH$_2$—O— or one of the groupings mentioned in the case of $X^5/R^5$, or $X^{6''}$ with $R^{6''}$ and $R^{7'}$ denotes a grouping of the formula

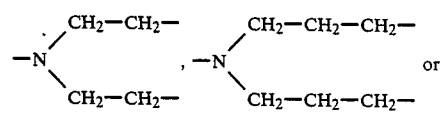

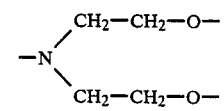

$R^{7'}$ denotes hydrogen, methyl, ethyl, chlorine, methoxy, ethoxy, methylamino, ethylamino or dimethylamino.

6. A mixture of chromogenic 3,1-benzoxazines of the formula

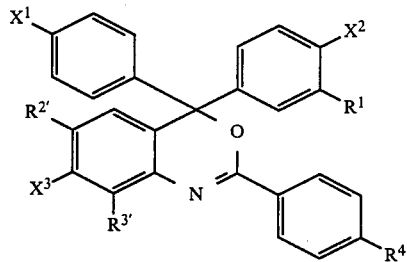

and

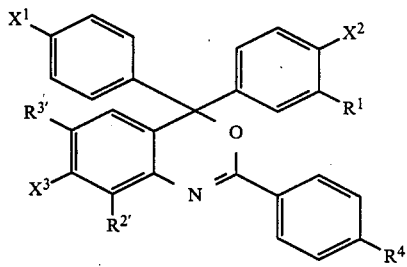

wherein
$X^1$ denotes hydrogen, $C_1$-$C_4$-alkyl, chlorine or $OY^1$, $X^2$ denotes $NY^2Y^3$, $X^3$ denotes $OY^4$ or $NY^5Y^6$, $R^1$ and $R^{3'}$ independently of one another denote hydrogen, $C_1$-$C_4$-alkyl, chlorine, $C_1$-$C_4$-alkoxy or $C_1$-$C_4$-mono- or -dialkylamino, $R^{2'}$ denotes $C_1$-$C_4$-alkyl, chlorine, $C_1$-$C_4$-alkoxy or $C_1$-$C_4$-mono- or -dialkylamino, or $R^1$ together with $Y^2$, or $R^{2'}$ or $R^{3'}$, together with $Y^4$ or $Y^5$, denote a 2- to 4-membered bridge which can contain an oxygen or nitrogen atom and can carry up to 4 methyl groups, $Y^1$ and $Y^4$ independently of one another denote $C_1$-$C_4$-alkyl, cyclohexyl or benzyl and $Y^2$, $Y^3$, $Y^5$ and $Y^6$ independently of one another denote hydrogen, $C_1$-$C_4$-alkyl, cyclohexyl or benzyl, and $R^{2'}$ and $R^{3'}$ are different from one another with 3,1-benzoxazines of the formula

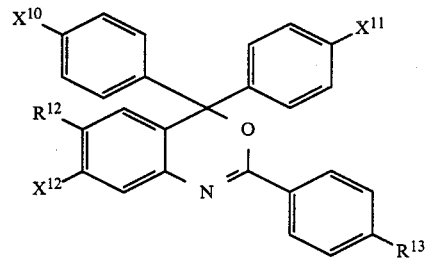

wherein $X^{10}$ denotes hydrogen, $C_1$-$C_4$-alkyl, chlorine or $OY^7$, $X^{11}$ denotes $NY^8Y^9$, $X^{12}$ denotes $OY^{10}$ or $NY^{11}Y^{12}$, $R^{12}$ denotes hydrogen, $C_1$-$C_4$-alkyl, chlorine, $C_1$-$C_4$alkoxy or $C_1$-$C_4$-mono- or -dialkylamino, $R^{13}$ denotes hydrogen, methyl or chlorine, $Y^7$ and $Y^{10}$ independently of one another denote $C_1$-$C_4$-alkyl, cyclohexyl or benzyl and $Y^8$, $Y^9$, $Y^{11}$ and $Y^{12}$ independently of one another denote hydrogen, $C_1$-$C_4$-alkyl, cyclohexyl or benzyl.

* * * * *

UNITED STATES PATENT AND TRADEMARK OFFICE
CERTIFICATE OF CORRECTION

PATENT NO. : 4,831,141          Page 1 of 2
DATED      : May 16, 1989
INVENTOR(S): Horst Berneth, et al It is certified that error appears in the above-identified patent and that said Letters Patent is hereby corrected as shown below:

| | |
|---|---|
| Col. 2, line 60 | Bottom of structural formula delete "R'" and substitute --$R^{7'}$-- |
| Col. 18, line 56 | Before "3,1-" insert --the-- |
| Col. 19, line 35 | After "with" delete "a" |
| Col. 23, line 50 | Delete "$Y_3$" and substitute --$Y^3$-- |
| Col. 24, line 21 | Delete "dialkylamine" and substitute --dialkylamino-- |
| Col. 25, lines 14-15 | Correct spelling of --methoxy-- |
| Col. 25, line 16 | Correct spelling of --diethylamino-- |
| Col. 25, line 58 | Rightside of structural formula delete "$R^5$" and substitute --$R^{5'}$-- |
| Col. 25, line 62 | Leftside of structural formula delete "$X^6$" and substitute --$X^{6'}$-- |
| Col. 26, line 15 | Bottom left of structural formula delete "$R^7$" and substitute --$R^{7'}$-- |

UNITED STATES PATENT AND TRADEMARK OFFICE
CERTIFICATE OF CORRECTION

PATENT NO. : 4,831,141                    Page 2 of 2

DATED : May 16, 1989

INVENTOR(S) : Horst Berneth, et al

It is certified that error appears in the above-identified patent and that said Letters Patent is hereby corrected as shown below:

Col. 28, line 18              After "$C_4$" insert -- - --

Signed and Sealed this

Seventeenth Day of July, 1990

Attest:

HARRY F. MANBECK, JR.

Attesting Officer          Commissioner of Patents and Trademarks